United States Patent
Guajardo Merchan et al.

(10) Patent No.: US 11,165,594 B2
(45) Date of Patent: Nov. 2, 2021

(54) REVERSE COMPUTATIONAL FUZZY EXTRACTOR AND METHOD FOR AUTHENTICATION

(71) Applicant: Robert Bosch GmbH, Stuttgart (DE)

(72) Inventors: Jorge Guajardo Merchan, Pittsburgh, PA (US); Paulius Duplys, Markgroeningen (DE); Christopher Huth, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 16/320,769

(22) PCT Filed: Dec. 27, 2017

(86) PCT No.: PCT/EP2017/084606
§ 371 (c)(1),
(2) Date: Jan. 25, 2019

(87) PCT Pub. No.: WO2018/122235
PCT Pub. Date: Jul. 5, 2018

(65) Prior Publication Data
US 2019/0165958 A1   May 30, 2019

Related U.S. Application Data

(60) Provisional application No. 62/440,685, filed on Dec. 30, 2016.

(51) Int. Cl.
*H04L 9/32* (2006.01)
*H04L 9/08* (2006.01)

(52) U.S. Cl.
CPC ............ *H04L 9/3278* (2013.01); *H04L 9/085* (2013.01); *H04L 2209/122* (2013.01); *H04L 2209/34* (2013.01)

(58) Field of Classification Search
CPC ..................................................... H04L 9/3278
See application file for complete search history.

(56) References Cited

U.S. PATENT DOCUMENTS

| | | | | |
|---|---|---|---|---|
| 2007/0044139 | A1* | 2/2007 | Tuyls | G06K 9/00885 726/2 |
| 2013/0133031 | A1* | 5/2013 | Fainstein | G06F 21/73 726/2 |
| 2015/0067012 | A1* | 3/2015 | Goettfert | G06F 17/16 708/520 |

OTHER PUBLICATIONS

Dodis, Y. et al., Fuzzy extractors: How to generate strong keys from biometrics and other noisy data, In Advances in cryptology—Eurocrypt 2004, pp. 523-540, Springer, 2004.

(Continued)

*Primary Examiner* — Simon P Kanaan
(74) *Attorney, Agent, or Firm* — Maginot, Moore & Beck LLP

(57) ABSTRACT

A method and system for authenticating a first device is disclosed. The method includes the steps of: measuring a first response bit string of a physical unclonable function of the first device with respect to a challenge bit string, the physical unclonable function being provided by one of the processor of the first device and a further physical component of the first device; deriving a shared secret bit string from a uniformly distributed random vector; encoding a helper bit string by multiplying a uniformly distributed random matrix with the uniformly distributed random vector and adding the first response bit string to a result of the multiplication; and transmitting the helper bit string to a second device that is remote from the first device.

20 Claims, 3 Drawing Sheets

(56) References Cited

OTHER PUBLICATIONS

Schaller, A. et al., Eliminating leakage in reverse fuzzy extractors, International Association for Cryptologic Research (IACR), Sep. 26, 2014 (6 pages).
International Search Report corresponding to PCT Application No. PCT/EP2017/084606, dated Mar. 22, 2018 (English language document) (3 pages).
Fuller, Benjamin et al., Computational Fuzzy Extractors, Dec. 1, 2013 (Dec. 1, 2013), ECCV 2016 Conference, Lecture Notes in Computer Science, pp. 174-193.
Huth, Christopher et al., Securing Systems with Scarce Entropy: LWE-Based Lossless Computational Fuzzy Extractor for the IoT, International Association for Cryptologic Research, vol. 20161015:190825, Oct. 11, 2016 (Oct. 11, 2016), pp. 1-33.
Van Herrewege, Anthony et al., Reverse Fuzzy Extractors: Enabling Lightweight Mutual Authentication for PUF-Enabled RFIDs, Mar. 2, 2012 (Mar. 2, 2012), Financial Cryptography and Data Security, pp. 374-379.

\* cited by examiner

REVERSE COMPUTATIONAL FUZZY EXTRACTOR AND METHOD FOR AUTHENTICATION

This application is a 35 U.S.C. § 371 National Stage Application of PCT/EP2017/084606 filed on Dec. 27, 2017, which claims the benefit of priority of U.S. provisional application Ser. No. 62/440,685, filed on Dec. 30, 2016, the disclosures of which are herein incorporated by reference in their entirety.

FIELD

The method and devices disclosed in this document relates to cryptography and, more particularly, to use of physical unclonable functions and fuzzy extractors for device authentication.

BACKGROUND

In some applications, physical unclonable functions (PUFs) are used to authenticate devices. However, the raw response of any PUF is noisy and has to be post-processed to derive e.g. an identical key every time the PUF is queried. Fuzzy extractors can be constructed with error correcting codes and used to remove the noise from the PUF's raw response using so-called helper data, which is publicly available. Due to the nature of the error correcting codes (and the redundancy information present in the helper data), traditional information-theoretic fuzzy extractors do not preserve the entire entropy present in the PUF's raw response. For example, if the raw response of a PUF has n bits of entropy, only m bits can be used after the raw response of the PUF is processed by a traditional information-theoretic fuzzy extractor, where m<n. Such a loss of entropy is particularly bad in situations where the PUF's raw response has a limited amount of entropy. As an example, preliminary experiments indicate that the entropy of a MEMS-PUF's raw response amount to little less than 90 bits. However, this is not sufficient in terms of security if the PUF response is used to derive a symmetric key. For instance, the German BSI technical guideline TR-02102-1 "Kryptographische Verfahren: Empfehlungen and Schlüssellängen" (version 2015-01, 10 Feb. 2015) requires a symmetric secret key length of at least 128 bits.

Accordingly, it would be advantageous to provide an alternative to the traditional fuzzy extractor in which the full entropy of a PUF can be preserved and from which longer keys can be derived. Furthermore, it would also be advantageous if the method could be used to authenticate lightweight PUF-enabled devices having minimal processing capability and memory capacity.

SUMMARY

A method for authenticating a first device is disclosed. The method includes the steps of: measuring a first response bit string of a physical unclonable function of the first device with respect to a challenge bit string, the physical unclonable function being provided by one of the processor of the first device and a further physical component of the first device; deriving, with the processor of the first device, a shared secret bit string from a uniformly distributed random vector; encoding, with the processor of the first device, a helper bit string by multiplying a uniformly distributed random matrix with the uniformly distributed random vector and adding the first response bit string to a result of the multiplication; and transmitting, with a transceiver of the first device, the helper bit string to a second device that is remote from the first device.

A system for authenticating a first device is disclosed. The system includes a first device having (i) a transceiver, (ii) a memory storage, and (iii) a processor operably connected to the transceiver and the memory storage, one of the processor and a further physical component of the first device being configured to provide a physical unclonable function that is usable by the processor. The processor is configured to: receive a measurement of a first response bit string of the physical unclonable function of the first device with respect to a challenge bit string; derive a shared secret bit string from a uniformly distributed random vector; encode a helper bit string by multiplying a uniformly distributed random matrix with the uniformly distributed random vector and adding the first response bit string to a result of the multiplication; and operate the transceiver of the first device to transmit the helper bit string to a second device that is remote from the first device.

BRIEF DESCRIPTION OF THE DRAWINGS

The foregoing aspects and other features of the method and devices are explained in the following description, taken in connection with the accompanying drawings.

DETAILED DESCRIPTION

Figure 1:
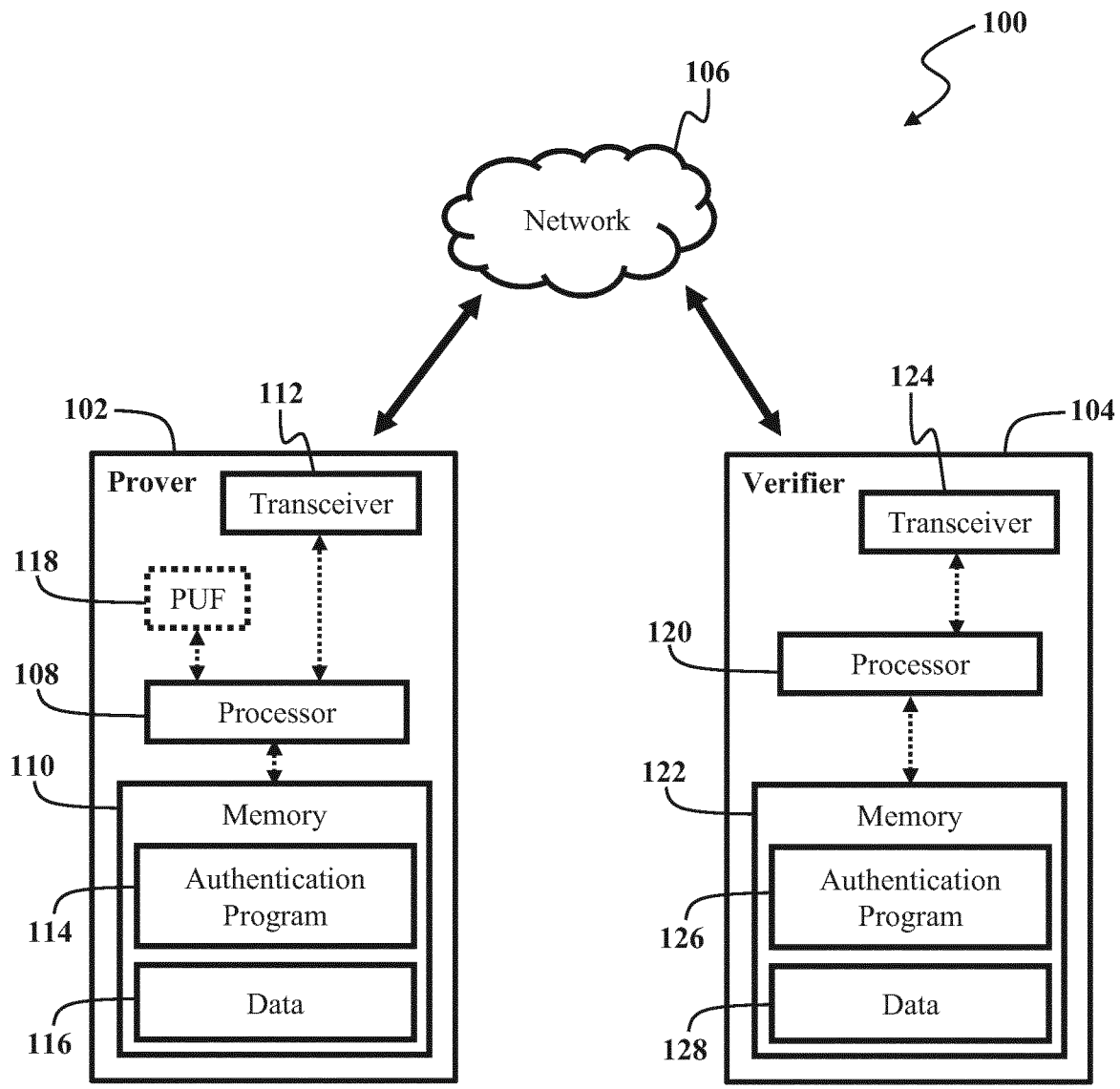
FIG. 1 shows a system comprising a proving device and a verifying device.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

FIG. 1 shows a system 100 comprising a proving device 102 (also referred to herein as the "prover") and a verifying device 104 (also referred to herein as the "verifier"). The proving device 102 and the verifying device 104 communicate with one another via an insecure communication channel, such as a network 106 (e.g., the Internet, a wireless local area network, or a wireless mesh network) or a direct communication channel (e.g., radio frequency identification (RFID) or near-field-communication (NFC)). Given the insecurity of the communication channel, the verifying device 104 and the proving device 102 are configured to perform an authentication process at least to verify the identity and authenticity of the proving device 102. In some embodiments, the authentication process is a mutual authentication process in which the identities and authenticity of both devices 102 and 104 are verified.

In some embodiments, the proving device 102 may comprise a security token, a smart card, a hardware security module, a machine, a controller, an actuator, a sensor, a tablet computer, a smartphone, a laptop, or any other device configured for communication with a host system or another device. In at least some embodiments, the proving device is a lightweight device with relatively limited processing capability and memory, such as an Internet of Things (IoT) device.

In the embodiment shown, the proving device 102 comprises a processor 108, memory 110, and a transceiver 112. The proving device 102 may also comprise many additional components which are operably connected to the processor 108 and configured to provide one or more services or functions, such as sensing elements, actuators, interfaces, displays, etc. (not shown). The memory 110 is configured to store program instructions that, when executed by the processor 108, enable the proving device 102 to perform one or more services or functions. In addition to program instructions for implementing the primary services or functions of the proving device 102, the program instructions at least include an authentication program 114 for proving the identity and authenticity of the proving device 102 to the verifying device 104. The memory 110 is also configured to store data 116, which may include data utilized by the authentication program 126.

The memory 110 may be of any type of device capable of storing information accessible by the processor 108, such as a memory card, ROM, RAM, write-capable memories, read-only memories, hard drives, discs, flash memory, or any of various other computer-readable medium serving as data storage devices as will be recognized by those of ordinary skill in the art. Additionally, although the memory 110 is shown monolithically in F, the memory 110 may comprise several discrete memories of different types which are used for different purposes.

The processor 108 may include a system with a central processor, multiple processors, dedicated circuitry for achieving functionality, or other systems. Furthermore, it will be recognized by those of ordinary skill in the art that a "processor" includes any hardware system, hardware mechanism or hardware component that processes data, signals or other information.

The transceiver 112 may be any of various devices configured for communication with other electronic devices, including the ability to send communication signals and receive communication signals. The transceiver 112 may include different types of transceivers configured to communicate with different networks and systems. The transceiver 112 is at least configured to exchange data between the proving device 102 and the verifying device 104, but may also be configured to communicate with additional devices on the network 106. In one embodiment, the transceiver 112 is configured to exchange data using a protocol such as Wi-Fi, Bluetooth, RFID, NFC, ZigBee, Z-Wave, or Ethernet.

The proving device 102 also has a physical unclonable function (PUF) 118, which can be utilized by the processor 108, configured to receive an input (e.g., a challenge bit string) and produce a unique output (e.g., a response bit string). The output response of the PUF 118 depends on the unique physical structure of at least one component of the proving device 102 and serves as a digital fingerprint for the proving device 102. In at least one embodiment, a semiconductor device, such as the processor 108, the memory 110, the transceiver 112, or a MEMS-sensor (not shown) of the proving device 102 provides the basis for the PUF 118. In other embodiments, the proving device 102 may include a dedicated semiconductor device (not shown) configured only to provide the PUF 118.

The microstructure of the semiconductor device, or other component, which provides the PUF 118 includes random physical variations that are naturally introduced by during manufacture and that are not feasibly controlled or replicated, even by the manufacturer. Additionally, in some types of PUF-enabled semiconductor devices, variations in environmental conditions, such as temperature, supply voltage, and electromagnetic interference also introduce randomness and unpredictability into the operation of the device. As a result, the PUF 118 has a unique and unpredictable way of generating a response to a particular input. Furthermore, for a given challenge input string, the PUF 118 does not necessarily reliably produce exactly the same response string each time. Instead, for a given challenge input string, the PUF 118 may generate reliably similar but not identical responses each time it is used. In this way, the PUF 118 can be considered to have a noisy response.

In contrast to the proving device 102, in some embodiments, the verifying device 104 is a host system such as a remote server, a local control hub (e.g., as used in home automation systems), a payment kiosk, or any other device which must verify the identity and authenticity of connected devices. Additionally, the verifying device 104 generally has more processing capability and more memory than the proving device 102 and is better suited to bear any computationally or memory intensive aspects of the authentication process.

In the embodiment shown, the verifying device 104 comprises a processor 120, memory 122, and a transceiver 124. The memory 122 is configured to store program instructions that, when executed by the processor 120, enable the verifying device 104 to perform one or more services or functions. In addition to program instructions for implementing the primary services or functions of the verifying device 104, the program instructions at least include an authentication program 126 for verifying the identity and authenticity of the proving device 102. The memory 122 is also configured to store data 128, which may include data utilized by the authentication program 126, such as pairs of challenges and measured responses of the PUF 118 of the proving device 102.

The memory 122 may be of any type of device capable of storing information accessible by the processor 120, such as a memory card, ROM, RAM, write-capable memories, read-only memories, hard drives, discs, flash memory, or any of various other computer-readable medium serving as data storage devices as will be recognized by those of ordinary skill in the art. Additionally, although the memory 122 is shown monolithically in the figure, the memory 122 may comprise several discrete memories of different types which are used for different purposes.

The processor 120 may include a system with a central processor, multiple processors, dedicated circuitry for achieving functionality, or other systems. Furthermore, it will be recognized by those of ordinary skill in the art that a "processor" includes any hardware system, hardware mechanism or hardware component that processes data, signals or other information.

The transceiver 124 may be any of various devices configured for communication with other electronic devices, including the ability to send communication signals and receive communication signals. The transceiver 124 may include different types of transceivers configured to communicate with different networks and systems. The transceiver 124 is at least configured to exchange data between the verifying device 104 and the proving device 102, but may also be configured to communicate with additional devices on the network 106. In one embodiment, the transceiver 124 is configured to exchange data using a protocol such as Wi-Fi, Bluetooth, RFID, NFC, ZigBee, Z-Wave, or Ethernet.

Figure 2:
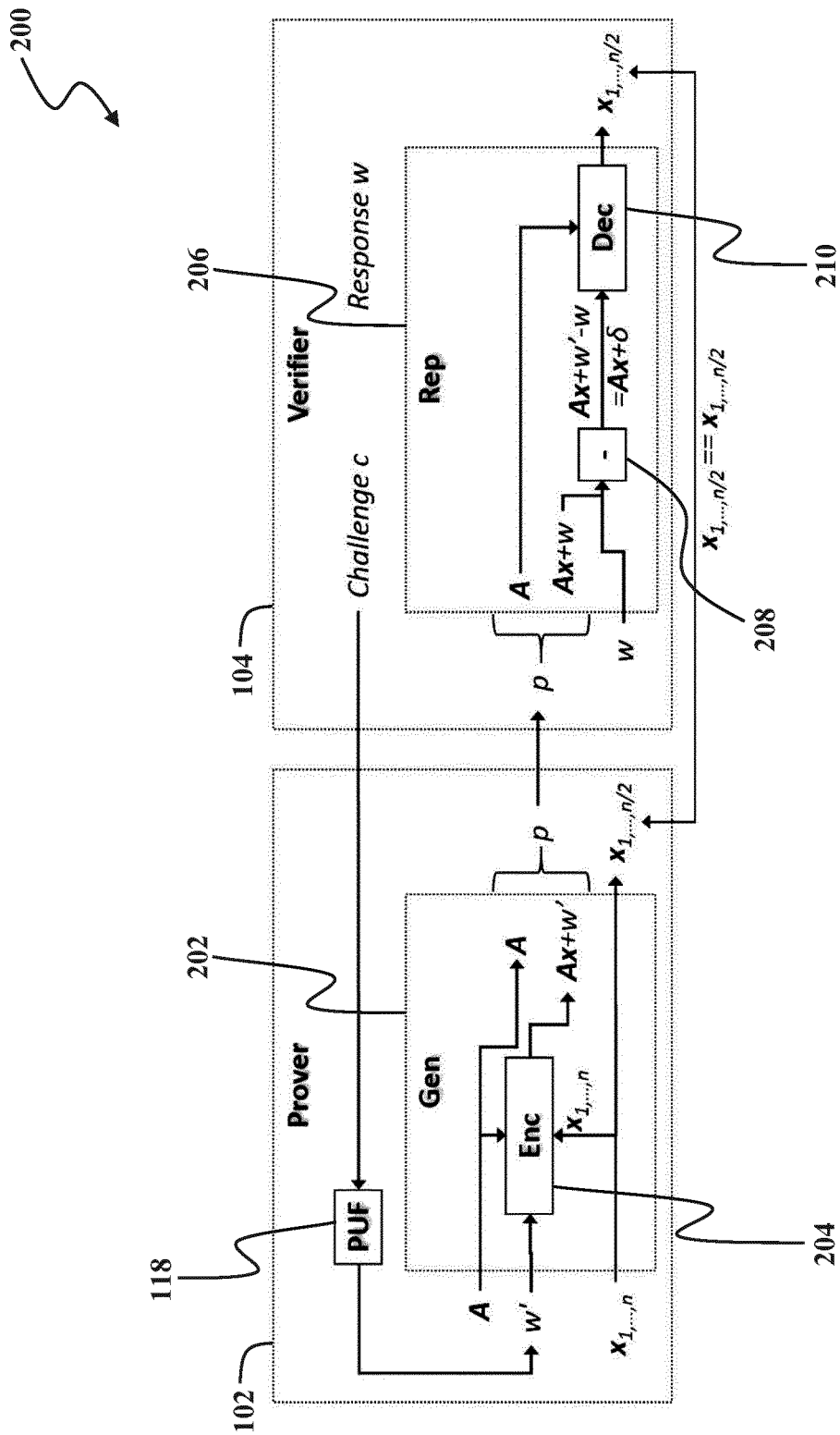
FIG. 2 shows a block diagram of a reverse computational fuzzy extractor.

FIG. 2 shows a block diagram of a reverse computational fuzzy extractor 200. Unlike traditional fuzzy extractors, which are defined as information-theoretic objects, the reverse computational fuzzy extractor 200 leverages computational security based on the Learning with Errors (LWE), which is post-quantum secure, problem to preserve the full entropy of the PUF 118 and obtain longer cryptographic keys. Unlike many traditional fuzzy extractors, the cryptographic key is not extracted from the PUF response. Instead, a random linear code is used to derive a longer key using LWE assumptions and the PUF response is used to "encrypt" the key in a manner that is decryptable with knowledge of a sufficiently similar PUF response.

The reverse computational fuzzy extractor 200 includes a generate function 202. The generate function 202 receives as an input a measured response w' of the PUF 118. Additionally, the generate function 202 receives as inputs a uniformly distributed random matrix A and a uniformly distributed random vector $x_{1, \ldots, n}$. In at least one embodiment, the vector is a random linear code. In one exemplary embodiment, the matrix A and the vector $x_{1, \ldots, n}$ are uniformly sampled over a finite field $\mathbb{F}_q$ according to $A \in \mathbb{F}_q^{m \times n}$ and $x \in \mathbb{F}_q^n$, where n is a security parameter, m≥n, and q is prime, as described in *Computational Fuzzy Extractors* (Benjamin Fuller, Xianrui Meng, and Leonid Reyzin. In *Advances in Cryptology-ASIACRYPT* 2013, pages 174-193. Springer, 2013), in which m, n, and q are selected so as to maintain the full entropy of the source which provides the input string w'. The generate function 202 includes an encode function 204 that computes the vector Ax+w' using matrix multiplication and addition, which can be considered an encryption of $x_{1, \ldots, n}$ where decryption works from any close w. The encode function 204 advantageously masks any statistical bias in the response w' of the PUF 118 due the uniform distribution of the matrix A and the vector $x_{1, \ldots, n}$. Additionally, the generate function 202 derives a shared secret $x_{1, \ldots, n/2}$ from the random vector $x_{1, \ldots, n}$. In one embodiment, the shared secret $x_{1, \ldots, n/2}$ is a bit string comprising the first through n/2 elements or the random vector $x_{1, \ldots, n}$. In one embodiment, the shared secret $x_{1, \ldots, n/2}$ is the same as the random vector $x_{1, \ldots, n}$. The outputs of the generate function 202 are the shared secret $x_{1, \ldots, n/2}$ and helper data p=(A, Ax+w'). The helper data p is considered public data and may be known to an adversary, whereas the shared secret $x_{1, \ldots, n/2}$ may be used a cryptographic key or for authentication.

The reverse computational fuzzy extractor 200 further includes a reproduce function 206. The reproduce function 206 receives as an input a previously measured response w of the PUF 118. Additionally, the reproduce function 206 receives as inputs helper data p=(A, Ax+w'). The reproduce function 206 includes a subtract function 208 that computes b=Ax+w'−w=Ax+δ. Additionally, the reproduce function 206 includes a decode function 210 that decodes the result of the subtraction Ax+δ and is able to output at the shared secret $x_{1, \ldots, n/2}$ if the response w' is sufficiently close and/or similar to the response w according to some predefined metric (e.g., Hamming distance between w' and w is less than t). Otherwise, if the response w' is not sufficiently close and/or similar to the response w (e.g., Hamming distance between w' and w is greater than t), the decode function 210 fails to resolve and outputs an error value ⊥. One embodiment of such a decoding algorithm is known in *Computational Fuzzy Extractors* (Benjamin Fuller, Xianrui Meng, and Leonid Reyzin. In *Advances in Cryptology-ASIACRYPT* 2013, pages 174-193. Springer, 2013), in which the decoding algorithm (1) randomly selects rows without replacement $i_1, \ldots, i_{2n} \leftarrow [1,m]$; (2) restricts A, b to rows $i_1, \ldots, i_{2n}$ and denotes these $A_{i1, \ldots, i2n}, b_{i1, \ldots, i2n}$; (3) finds n rows of $A_{i1, \ldots, i2n}$ that are linearly independent and, if no such rows exist, outputs ⊥ and stops; (4) denotes by A', b' the restriction of $A_{i1, \ldots, i2n}, b_{i1, \ldots, i2n}$ (respectively) to these rows and computes $x'=(A')^{-1}b'$; (5) returns to step (1) if b−Ax' has more than t nonzero coordinates; and (6) outputs x'. The output of the reproduce function 206 is the shared secret $x_{1, \ldots, n/2}$ or the error value ⊥, depending on the resolution of the decode function 210.

In some embodiments, the generate function 202 and reproduce function 206 of the robust computational fuzzy extractor 200 are implemented in a silicon blocks in the processor 108 and/or the processor 120 and are accessible as functions in the processors. In other embodiments, the generate function 202 and reproduce function 206 of the fuzzy extractor 200 are implemented using a combination of hardware and software, or purely software (e.g., the authentication programs 114 and 126), preferably using an area of the memory 110 and/or the memory 122 that stores software instructions but cannot be easily modified to ensure that the software instructions for the fuzzy extractor are not altered.

As discussed in greater detail below, during an authentication process, the proving device 102 receives a challenge c (e.g., a bit-string) from the verifying device 104. The challenge string c is provided to the PUF 118, which outputs a noisy response w'. The generate function 202 outputs the helper data p and the shared secret $x_{1, \ldots, n/2}$, based on the noisy response w', the matrix A, and the vector $x_{1, \ldots, n}$. The helper data p is provided to the verifying device 104 and the reproduce function 206 outputs either the shared secret $x_{1, \ldots, n/2}$ or the error value ⊥, based a previously measured response w and the helper data p. If the shared secret $x_{1, \ldots, n/2}$ is successfully output, then the verifying device 104 knows that the proving device 102 is authentic (i.e., includes the unique PUF device 118). Otherwise, if the error value ⊥ is output, then the verifying device 104 knows at the proving device 102 is not authentic (i.e. does not include the unique PUF device 118).

Figure 3:
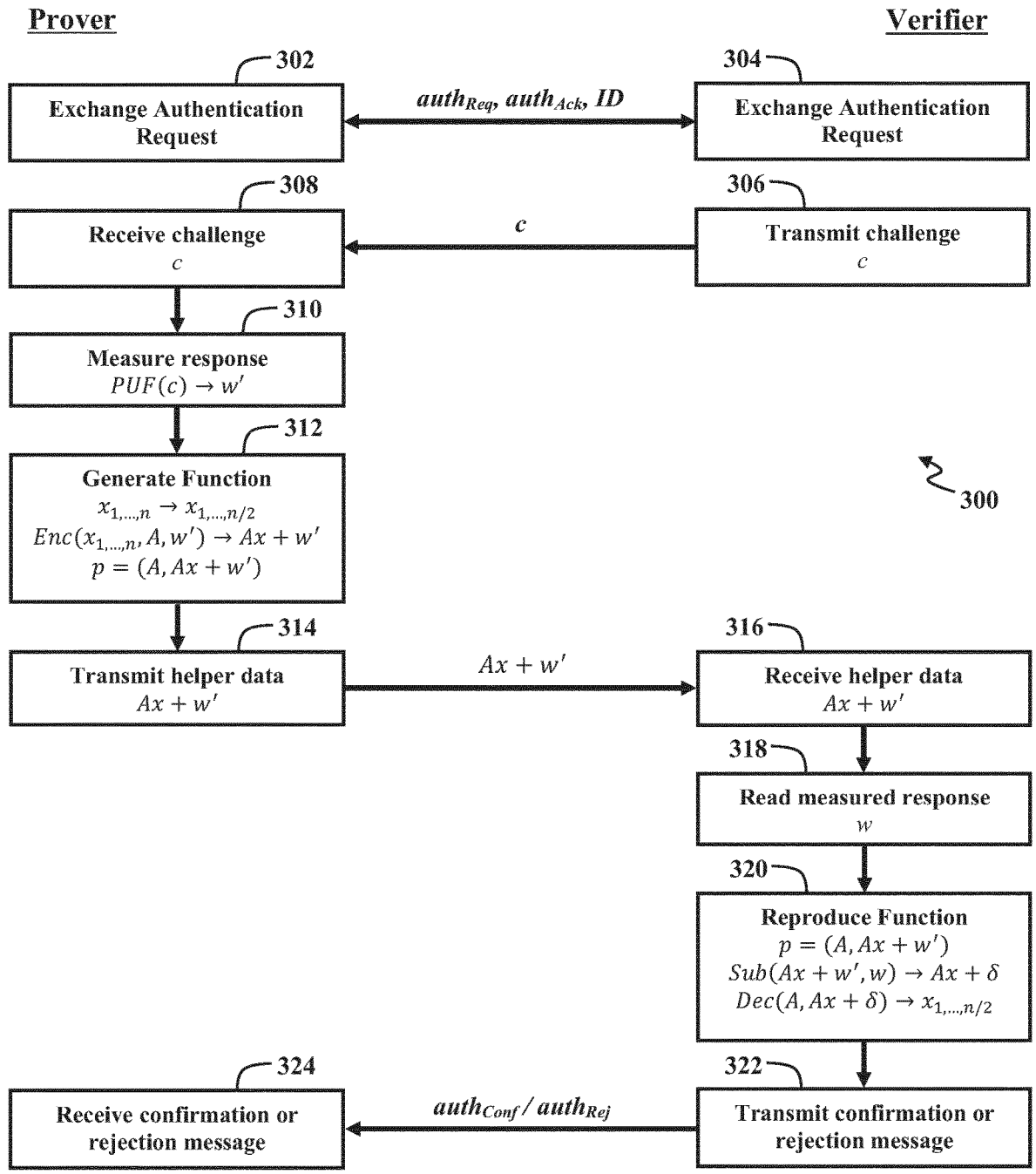
FIG. 3 shows a method for authenticating a device using the reverse computational fuzzy extractor.

FIG. 3 shows a detailed method 300 for authenticating a device using the reverse computational fuzzy extractor 200. In the description of the method, statements that the method is performing some task or function refers to a controller or general purpose processor executing programmed instructions stored in non-transitory computer readable storage media operatively connected to the controller or processor to manipulate data or to operate one or more components in the system 100 to perform the task or function. The processor 108 of the proving device 102 or the processor 120 of the verifying device 104 above may be such a controller or processor and the executed program instructions (e.g., the authentication programs 114 and 126) may be stored in the memories 110 and 122. Additionally, the steps of the methods may be performed in any feasible chronological order, regardless of the order shown in the figures or the order in which the steps are described.

The method 300 begins with steps of exchanging authentication requests and authentication request acknowledgements between a verifying device and a proving device to prepare for authentication (blocks 302 and 304). Particularly, with reference to the particular embodiments discussed in detail herein, as a preliminary step, the proving device 102 and the verifying device 104 are configured to exchange authentication request and authentication request acknowledgement messages to prepare for authentication of the proving device 102. In one embodiment, the processor 108 of the proving device 102 is configured to operate the transceiver 112 to transmit an authentication request $auth_{Req}$ to the verifying device 104. In at least one embodiment, the authentication request $auth_{Req}$ includes an identifier ID that uniquely identifies the proving device 102. The verifying device 104 receives the authentication request $auth_{Req}$ with the transceiver 124. The processor 120 of the verifying device 104 is configured to compare the received identifier ID with a list of known identifiers stored in the database 128. If the identifier ID is a known identifier, the processor 120 is configured to operate the transceiver 124 to transmit an authentication request acknowledgement $auth_{Ack}$ to the proving device 102. It is noted that in some embodiments, the verifying device 102 is configured to transmit an authentication request $auth_{Req}$ to the proving device 102 and the proving device 102 is configured to transmit an authentication request acknowledgement $auth_{Ack}$, with the identifier ID, to the verifying device 104.

The method 300 continues with steps of transmitting a challenge bit string from the verifying device (block 306) and receiving the challenge bit string at the proving device (block 308). Particularly, in some embodiments, the processor 120 of the verifying device 104 operates the transceiver 124 to transmit a challenge bit string c to the proving device 102. In some embodiments, for each known identifier ID, the database 128 of the verifying device 104 stores a plurality of challenge-response bit string pairs ($c_i$, $w_i$), where each response bit string $w_i$ is a measured response of the PUF 118 (which corresponds to a respective identifier ID) to a different challenge bit string $c_i$. In at least one embodiment, the pairs are generated at a time of manufacture of the proving device 102, at a time of manufacture of the particular component which comprises the PUF 118, or otherwise prior to the authentication process. After or in response to receiving the authentication request $auth_{Req}$ from the proving device 102, the processor 120 of the verifying device 104 is configured to select a challenge bit string c from the database 128 and operate the transceiver 124 to transmit the challenge bit string c to the proving device 102. In one embodiment, the processor 120 is configured to select the challenge bit string c from the plurality of challenge bit strings $c_i$ using a time table or other rule set for deciding which challenge bit string c is to be utilized. The proving device 102 is configured to receive the challenge bit string c with the transceiver 112.

In some alternative embodiments, the challenge bit string c may be installed on onto the memory 110 of the proving device 102 at a time of manufacture. In such embodiments, the step of transmitting the challenge bit string c from the verifying devices 104 (block 306) may be omitted. Instead, the processor 108 of the proving device 102 is configured to read the challenge bit string c from the memory 110. In one embodiment, the processor 108 reads the challenge bit string c in response to receiving the authentication request acknowledgement $auth_{Ack}$. In some embodiments a plurality of challenge bit strings $c_i$ are stored in the memory 110. In one embodiment, the processor 108 is configured to select a challenge bit string c from the plurality of challenge bit strings $c_i$ using a time table or other rule set for deciding which challenge bit string c is to be utilized.

The method 300 continues with a step of measuring a response bit string of a physical unclonable function of the proving device to the challenge bit string (block 310). Particularly, the processor 108 of the proving device 102 is configured to provide the challenge bit string c as an input to the PUF 118. The processor 108 measures, receives, or otherwise determines a noisy response w' of the PUF 118 to the challenge bit string c.

The method 300 continues with a step of generating a shared secret bit string and public helper data using the generate function of the reverse computational fuzzy extractor (block 312). Particularly, the processor 108 of the proving device 102 is configured to derive a shared secret bit string $x_{1, \ldots, n/2}$ from a uniformly distributed random vector $x_{1, \ldots, n}$, using the generate function 202 of the reverse computation fuzzy extractor 200 as discussed above with respect to FIG. 2. Furthermore, the processor 108 is configured to encode a helper bit string Ax+w' by multiplying a uniformly distributed random matrix A with the uniformly distributed random vector $x_{1, \ldots, n}$ and adding the noisy response bit string w' to a result of the multiplication, using the encode function 204 of the generate function 202 of the reverse computation fuzzy extractor 200 as discussed above with respect to FIG. 2. In one embodiment, the processor 108 is configured to generate the uniformly distributed random vector $x_{1, \ldots, n}$ at the time of authentication. In one embodiment, the processor 108 is configured to receive the uniformly distributed random matrix A, which is considered part of the public helper data p, from the verifying device 104 at the time of authentication, alongside the challenge bit string c or at some other prior time. However, in many embodiments, the uniformly distributed random matrix A is installed on the memory 110 at a time of manufacture and is reused during different authentications. After the initial deployment of the proving device 102, the verifying device 104 is configured to only transmit a new uniformly distributed random matrix A if necessary for security-related reasons. In alternative embodiments, the processor 108 of the proving device 102 may generate the uniformly distributed random matrix A and provide it to the verifying device 104.

The method 300 continues with steps of transmitting the helper bit string from the proving device (block 314) and receiving the helper bit string at the verifying device (block 316). Particularly, the processor 108 of the proving device 102 operates the transceiver 112 to transmit at least the helper bit string Ax+w' to the verifying device 104. The verifying device 104 is configured to receive the helper bit string Ax+w' with the transceiver 124. In some embodiments, the proving device 102 transmits all of the public helper data p, including the uniformly distributed random matrix A, to the verifying device 104.

The method 300 continues with a step of reading a previously measured response bit string of the physical unclonable function of the proving device to the challenge bit string from a memory of the verifying device (block 318). Particularly, as discussed above, the database 128 of the verifying device 104 stores a plurality of challenge-response bit string pairs ($c_i$,$w_i$), where each response bit string $w_i$ is a measured response of the PUF 118 to a different challenge bit string $c_i$. After receiving the helper bit string Ax+w', the processor 120 of the verifying device 104 is configured to read the previously measured response bit string w which corresponds to the challenge bit string c that was used by the proving device 102 to generate the helper bit string Ax+w'.

The method 300 continues with a step of reproducing the shared secret bit string using the reproduce function of the reverse computational fuzzy extractor (block 320). Particularly, the processor 120 of the verifying device 104 is configured to subtract the previously measured response bit string w from the helper bit string Ax+w', using the subtract function 208 of the reproduce function 206 of the reverse computation fuzzy extractor 200 as discussed above with respect to FIG. 2. Furthermore, the processor 120 is configured to attempt to derive the shared secret $x_1, \ldots, _{n/2}$ by decoding the result of the subtraction $Ax+\delta$, using the decode function 210 of the reproduce function 206 of the reverse computation fuzzy extractor 200 as discussed above with respect to FIG. 2. As discussed above, the decode function 210 is able to output the shared secret $x_1, \ldots, _{n/2}$ if the response w' is sufficiently close and/or similar to the response w according to some predefined metric (e.g., Hamming distance between w' and w is less than t). Otherwise, if the response w' is not sufficiently close and/or similar to the response w (e.g., Hamming distance between w' and w is greater than t), the decode function 210 fails to resolve and outputs an error value $\perp$.

The method 300 continues with steps of transmitting, from the verifying device, one of (i) a confirmation message indicating that authentication was successful and (ii) a rejection message indicating that authentication was unsuccessful (block 322) and receiving the one of (i) the confirmation message and (ii) the rejection message at the proving device (block 324). Particularly, in response to the shared secret $x_1, \ldots, _{n/2}$ being successfully derived from the decoding process, the processor 120 of the verifying device 104 is configured to operate the transceiver 124 to transmit an authentication confirmation message $auth_{conf}$ to the proving device 102, which indicates that the proving device 102 was successfully authenticated by the verifying device 104. In response to the decoding process failing to resolve and outputting the error value $\perp$, the processor 120 is configured to operate the transceiver 124 to transmit an authentication rejection message $auth_{rej}$ to the proving device 102, which indicates that the proving device 102 was not successfully authenticated by the verifying device 104.

The herein described methods (e.g., the method 300 and/or the reverse computational fuzzy extractor 200) improve the functioning of the proving device 102, and the verifying device 104, respectively or in combination by enabling it/them to operate more efficiently and securely to authenticate the proving device 102. Particularly, in one embodiment, the generate function 202 runs in $O(n^2)$ and the reproduce function 206 runs in $O(n^4)$. The computationally expensive reproduce function 206 is implemented on the verifying device 104, and the less computationally expensive generate function 202 is implemented on the proving device 102. In this way, the method can advantageously be implemented on light-weight proving devices 102. Additionally, due the uniform random distribution of the matrix A and the vector $x_1, \ldots, _n$, any statistical bias in the response of the PUF 118 is masked, without any additional steps required, thereby minimizing information leakage and improving the security of the system 100. Finally, the full entropy of the PUF 118 is retained and longer cryptographic keys can be obtained.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of authenticating a first device, the method comprising:
   measuring a first response bit string of a physical unclonable function of the first device with respect to a challenge bit string, the physical unclonable function being provided by a component of the first device;
   deriving, with a processor of the first device, a shared secret bit string from a uniformly distributed random vector;
   encoding, with the processor of the first device, a helper bit string by multiplying a uniformly distributed random matrix with the uniformly distributed random vector and adding the first response bit string to a result of the multiplication; and
   transmitting, with a transceiver of the first device, the helper bit string to a second device that is remote from the first device.

2. The method of claim 1 further comprising:
   receiving, with a transceiver of the second device, the helper bit string from the first device;
   reading, with a processor of the second device, a previously measured second response bit string of the physical unclonable function of the first device with respect to the challenge bit string from a memory storage of the second device, the second response bit string being measured and stored at a time of manufacture of the first device;
   subtracting, with the processor of the second device, the second response bit string from the helper bit string;
   decoding, with the processor of the second device, a result of the subtraction using the uniformly distributed random matrix, the shared secret bit string being provided from the decoding if the first response bit string is within a threshold level of similarity to the second response bit string, the decoding outputting an error value otherwise; and
   transmitting, with the transceiver of the second device, one of (i) a confirmation message indicating that authentication was successful and (ii) a rejection message indicating that authentication was unsuccessful to the first device, the confirmation message being transmitted only if shared secret bit string was provided from the decoding, the rejection message being transmitted otherwise.

3. The method of claim 2 further comprising:
   receiving, with the transceiver of the first device, the one of (i) the confirmation message and (ii) the rejection message from the second device.

4. The method of claim 1 further comprising:
   receiving, with the transceiver of the first device, the challenge bit string from the second device.

5. The method of claim 1 further comprising:
   reading the challenge bit string from a memory storage of the first device.

6. The method of claim 1 further comprising:
   reading, with the processor of the first device, the uniformly distributed random matrix from a memory storage of the first device, the uniformly distributed random matrix being stored in the memory storage at a time of manufacture of the first device.

7. The method of claim 1 further comprising:
   receiving, with the transmitter of the first device, the uniformly distributed random matrix from the second device; and
   storing, with the processor of the first device, the received uniformly distributed random matrix in a memory storage of the first device, the received uniformly distributed random matrix replacing any currently stored version of the uniformly distributed random matrix in the memory storage of the first device.

8. The method of claim 1 further comprising:
transmitting, with the transmitter of the first device, an authentication request message, the authentication request message including an identifier of the first device.

9. The method of claim 1, wherein the physical unclonable function is provided by one of the processor of the first device and a memory storage of the first device.

10. The method of claim 1, wherein the physical unclonable function is provided by a microelectromechanical system of the first device that is configured to provide the physical unclonable function.

11. A system comprising:
a first device having (i) a transceiver, (ii) a memory storage, and (iii) a processor operably connected to the transceiver and the memory storage, a component of the first device being configured to provide a physical unclonable function that is usable by the processor, the processor configured to:
receive a measurement of a first response bit string of the physical unclonable function of the first device with respect to a challenge bit string;
derive a shared secret bit string from a uniformly distributed random vector;
encode a helper bit string by multiplying a uniformly distributed random matrix with the uniformly distributed random vector and adding the first response bit string to a result of the multiplication; and
operate the transceiver of the first device to transmit the helper bit string to a second device that is remote from the first device.

12. The system of claim 11 further comprising:
the second device having (i) a transceiver, (ii) a memory storage, and (iii) a processor operably connected to the transceiver and the memory storage, the processor configured to:
operate the transceiver of the second device to receive the helper bit string from the first device;
read a previously measured second response bit string of the physical unclonable function of the first device with respect to the challenge bit string from the memory storage of the second device, the second response bit string being measured and stored at a time of manufacture of the first device;
subtract the second response bit string from the helper bit string;
decode a result of the subtraction, the shared secret bit string being provided from the decoding if the first response bit string is within a threshold level of similarity to the second response bit string, the decoding outputting an error value otherwise; and
transmit one of (i) a confirmation message indicating that authentication was successful and (ii) a rejection message indicating that authentication was unsuccessful to the first device, the confirmation message being transmitted only if shared secret bit string was provided from the decoding, the rejection message being transmitted otherwise.

13. The system of claim 12, the processor of the first device being further configured to:
operate the transceiver of the first device to receive the one of (i) the confirmation message and (ii) the rejection message from the second device.

14. The system of claim 11, the processor of the first device being further configured to:
operate the transceiver of the first device to receive the challenge bit string from the second device.

15. The system of claim 11, the processor of the first device being further configured to:
read the challenge bit string from the memory storage of the first device.

16. The system of claim 11, the processor of the first device being further configured to:
read the uniformly distributed random matrix from the memory storage of the first device, the uniformly distributed random matrix being stored in the memory storage at a time of manufacture of the first device.

17. The system of claim 11, the processor of the first device being further configured to:
operate the transceiver of the first device to receive the uniformly distributed random matrix from the second device; and
store the received uniformly distributed random matrix in the memory storage of the first device, the received uniformly distributed random matrix replacing any currently stored version of the uniformly distributed random matrix in the memory storage of the first device.

18. The system of claim 11, the processor of the first device being further configured to:
operate the transceiver of the first device to transmit an authentication request message, the authentication request message including an identifier of the first device.

19. The system of claim 11, wherein the physical unclonable function is provided by one of the processor of the first device and the memory storage of the first device.

20. The system of claim 11, the first device further comprising:
a microelectromechanical system operably connected to the processor and configured to provide the physical unclonable function.

* * * * *